United States Patent
Ko et al.

(10) Patent No.: US 7,542,119 B2
(45) Date of Patent: Jun. 2, 2009

(54) IN-PLANE SWITCHING MODE LIQUID CRYSTAL DISPLAY DEVICE AND METHOD OF FABRICATING THE SAME

(75) Inventors: Jeong-Hoon Ko, Ulsan (KR); Sung-Jin Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 641 days.

(21) Appl. No.: 11/246,234

(22) Filed: Oct. 11, 2005

(65) Prior Publication Data
US 2006/0139544 A1    Jun. 29, 2006

(30) Foreign Application Priority Data
Dec. 27, 2004    (KR) ...................... 10-2004-0112691

(51) Int. Cl.
*G02F 1/1343* (2006.01)
(52) U.S. Cl. ........................ 349/141; 349/139; 349/43
(58) Field of Classification Search ................. 349/141, 349/139, 138, 43, 129
See application file for complete search history.

(56) References Cited

U.S. PATENT DOCUMENTS

| | | | |
|---|---|---|---|
| 6,188,459 B1 * | 2/2001 | Kim ........................... | 349/141 |
| 6,483,566 B2 * | 11/2002 | Youn et al. .................. | 349/141 |
| 6,747,722 B2 * | 6/2004 | Ono et al. .................... | 349/141 |
| 6,859,248 B2 * | 2/2005 | Matsumoto et al. ......... | 349/141 |

* cited by examiner

*Primary Examiner*—Thoi V Duong
(74) *Attorney, Agent, or Firm*—McKenna Long & Aldridge LLP

(57) ABSTRACT

An array substrate for an in-plane switching mode liquid crystal display devices includes: a substrate; a gate line and a data line on the substrate, the gate line crossing the data line to define a pixel region; a common line parallel to the gate line; a thin film transistor connected to the gate line and the data line; a plurality of common electrodes extending from the common line, and a plurality of pixel electrodes alternating with the plurality of common electrodes, wherein a gap distance is defined as a width of a block by the adjacent common and pixel electrode in the pixel region, and at least one gap distance is different from the other gap distances.

26 Claims, 6 Drawing Sheets

US 7,542,119 B2

IN-PLANE SWITCHING MODE LIQUID CRYSTAL DISPLAY DEVICE AND METHOD OF FABRICATING THE SAME

This application claims the benefit of Korean Patent Application No. 2004-0112691, filed on Dec. 27, 2004, which is hereby incorporated by reference for all purposes as if set forth herein.

BACKGROUND OF THE INVENTION

1. Field of the Invention

The present invention relates to a liquid crystal display (LCD) device and a method of fabricating a liquid crystal display device, and more particularly, to an in-plane switching (IPS) mode liquid crystal display device and a method of fabricating the same.

2. Discussion of the Related Art

Flat panel display (FPD) devices having portability and low power consumption have been subject of recent researches in the coming of the information age. Among the various types of FPD devices, liquid crystal display (LCD) devices are widely used as monitors for notebook computers and desktop computers because of their high resolution, ability to display colors and superiority in displaying moving images.

In general, the LCD device uses the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately modulating the incident light.

There are several types LCD devices, and one of which is commonly referred to as active matrix LCD (AM-LCD) device. The AM-LCD device includes an array of pixels forming a matrix. Each of the pixels in the AM-LCD device includes a thin film transistor (TFT) and a pixel electrode. The AM-LCD devices are currently being developed because of their high resolution and superior quality for displaying moving pictures.

A related art LCD device includes a color filter substrate having a common electrode, an array substrate having a pixel electrode, and a liquid crystal layer interposed between the color filter substrate and the array substrate. In the related art LCD device, the liquid crystal layer is driven by a vertical electric field between the pixel electrode and the common electrode. The related art LCD device provides a superior transmittance and a high aperture ratio. However, the related art LCD device has a narrow viewing angle because it is driven by the vertical electric field. Various other types of LCD devices having wide viewing angles, such as in-plane switching mode (IPS) mode LCD device, have been developed.

FIG. 1 is a schematic cross-sectional view of an IPS mode LCD device according to the related art. In FIG. 1, an upper substrate 9 and a lower substrate 10 face and are spaced apart from each other. A liquid crystal layer 11 is interposed between the upper and the lower substrates 9 and 10. The upper substrate 9 and the lower substrate 10 may be referred to as a color filter substrate and an array substrate, respectively. A common electrode 17 and a pixel electrode 30 are formed on the lower substrate 10. The liquid crystal layer 11 is driven by a lateral electric field "L" between the common electrode 17 and the pixel electrode 30.

FIG. 2A is a schematic cross-sectional view of the related art in-plane switching mode liquid crystal display device in an ON state. In FIG. 2A, voltages are applied to a pixel electrode 30 and a common electrode 17 to generate an electric field "L" having horizontal and vertical portions. In the vertical portion of the electric field "L" over the pixel electrode 30 and the common electrode 17, first liquid crystal molecules 11a of the liquid crystal layer 11 are not re-aligned with the electric field "L," and a phase transition of the liquid crystal layer 11 does not occur. In the horizontal portion of the electric field "L" between the pixel electrode 30 and the common electrode 17, second liquid crystal molecules 11b of the liquid crystal layer 11 are horizontally re-aligned with the electric field "L." Thus, a phase transition of the liquid crystal layer 11 occurs in the horizontal portion of the electric field "L." Because the liquid crystal molecules are re-aligned with the horizontal portion of the electric field "L," the IPS mode LCD device has a wide viewing angle. For example, users can see images having a viewing angle of about 80° to about 85° along top, bottom, right and left directions with respect to a normal direction of the IPS mode LCD device.

FIG. 2B is a schematic cross-sectional view of the related art in-plane switching mode liquid crystal display device in an OFF state. In FIG. 2B, a horizontal electric field is not generated when the IPS mode LCD device is in the OFF state. Thus, liquid crystal molecules 11 are not re-aligned. Thus, a phase transition of the liquid crystal layer 11 does not occur.

Accordingly, since liquid crystal molecules in the liquid crystal layer 11 change directions while maintaining their longitudinal axes in a plane perpendicular to the direct viewing direction of a display, an IPS mode LCD device provides a wide viewing angle for the display device. For example, the viewing angle can range from 80 to 85 degrees along vertical and horizontal directions from a normal line vertical to an IPS mode LCD device.

FIG. 3 is a schematic plane view showing an array substrate for the related art in-plane switching mode liquid crystal display device. In FIG. 3, a gate line 43 and a common line 47 parallel to the gate line 43 are formed on an array substrate 40. A data line 60 crosses the gate line 43 and the common line 47 to define a pixel region "P." A thin film transistor "Tr" including a gate electrode 45, a semiconductor layer 50, a source electrode 53 and a drain electrode 55 is connected to the gate line 43 and the data line 60. The source electrode 53 extends from the data line 60 and the gate electrode 45 extends from the gate line 43.

In the pixel region "P," a pixel line 67 is connected to the drain electrode 55 and a plurality of pixel electrodes 70 extend from the pixel line 67. In addition, a plurality of common electrodes 49 extending from the common line 47 alternate with the plurality of pixel electrodes 70. For example, the plurality of common electrodes 49 may include first, second and third common electrodes 49a, 49b and 49c, and the plurality of pixel electrodes 70 may include first and second pixel electrodes 70a and 70b. The first and third common electrodes 49a and 49c are disposed at a periphery of the pixel region "P" adjacent to the data line 60, and the second common electrode 49b is disposed at a central portion of the pixel region "P" between the first and third common electrodes 49a and 49c. Even though not shown in FIG. 3, a gate insulating layer is formed on the first, second and third common electrodes 49a, 49b and 49c. The first and second pixel electrodes 70a and 70b are formed on the gate insulating layer. The first and second pixel electrodes 70a and 70b are alternately disposed with the first, second and third common electrodes 49a, 49b and 49c.

In addition, all gap distances between the common electrode and the pixel electrode are equal to each other. For the sake of illustration, a region between the common electrode and the adjacent pixel electrode may be defined as a block. Accordingly, a first block "B1" is defined between the first common electrode 49a and the first pixel electrode 70a. Similarly, second, third and fourth blocks "B2," "B3" and "B4" are defined between the first pixel electrode 70a and the second common electrode 49b, between the second common electrode 49b and the second pixel electrode 70b, and between the second pixel electrode 70b and the third common electrode 49c, respectively. The first to fourth blocks "B1" to "B4" have first to fourth widths "w1" to "w4," respectively, and the first to fourth widths "w1" to "w4" are equal to each other.

In the related art IPS mode LCD device, widths of the common electrode and the pixel electrode may be increased to strengthen a horizontal electric field with the same voltage. However, when the widths of the common electrode and the pixel electrode increase, aperture ratio is reduced. When the widths of the common electrode and the pixel electrode decrease, the aperture ratio may increase.

SUMMARY OF THE INVENTION

Accordingly, the present invention is directed to an in-plane mode liquid crystal display device and a method of fabricating the same that substantially obviates one or more of the problems due to limitations and disadvantages of the related art.

An advantage of the present invention is to provide an in-plane mode liquid crystal display device where a degree of design freedom is improved by changing a structure in a pixel region, and a method of fabricating the same.

Another advantage of the present invention is to provide an in-plane mode liquid crystal display device where aperture ratio and brightness are improved.

Another advantage of the present invention is to provide an in-plane mode liquid crystal display device where viewing angle is improved by a block structure of multi domain.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching mode liquid crystal display devices includes: a substrate; a gate line and a data line on the substrate, the gate line crossing the data line to define a pixel region; a common line parallel to the gate line; a thin film transistor connected to the gate line and the data line; a plurality of common electrodes extending from the common line, and a plurality of pixel electrodes alternating with the plurality of common electrodes, wherein a gap distance is defined as a width of a block by the adjacent common and pixel electrode in the pixel region, and at least one gap distance is different from the other gap distances.

In another aspect, a method of forming an array substrate for an in-plane switching mode liquid crystal display devices includes: forming a gate line, a common line parallel to the gate line, a plurality of common electrodes extending from the common line and a data line on a substrate, the gate line crossing the data line to define a pixel region; forming a thin film transistor connected to the gate line and the data line; and forming a plurality of pixel electrodes alternating with the plurality of common electrodes, wherein a gap distance is defined as a width of a block by the adjacent common and pixel electrode in the pixel region, and at least one gap distance is different from the other gap distances.

In a further aspect of the present invention, an in-plane switching mode liquid crystal display device, comprising a substrate; a gate line and a data line on the substrate, the gate line crossing the data line to define a pixel region; a common line parallel to the gate line; a thin film transistor connected to the gate line and the data line; a plurality of common electrodes extending from the common line; and a plurality of pixel electrodes alternating with the plurality of common electrodes, wherein a gap distance is defined as a width of a block by the adjacent common and pixel electrode in the pixel region, and at least one gap distance is different from the other gap distances, wherein the at least one gap distance different from the other gap distances provides a multi-domain structure to improve the viewing angle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
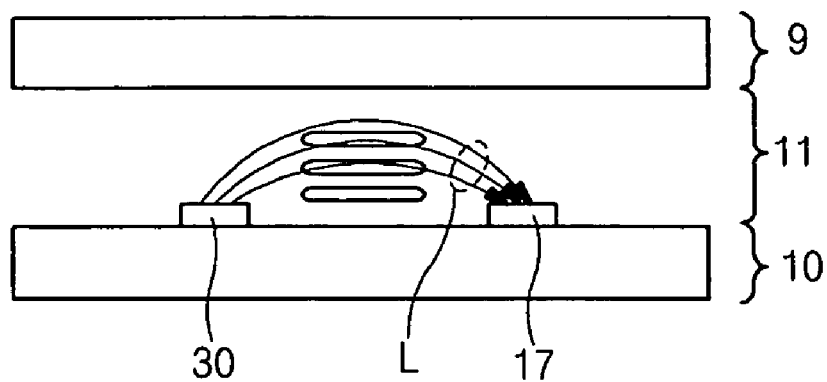
FIG. 1 is a schematic cross-sectional view of an IPS mode LCD device according to the related art.
Figure 2A:
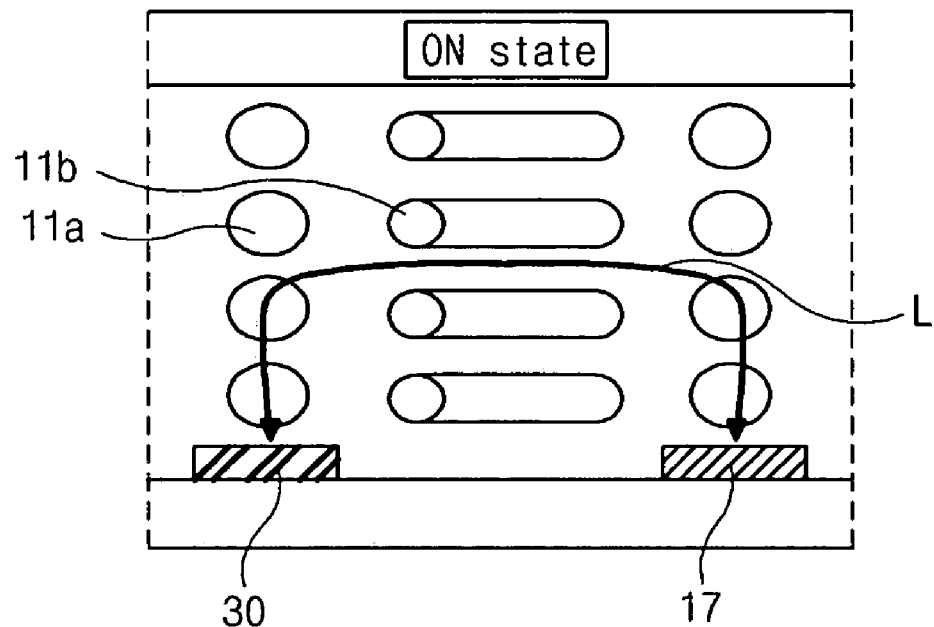
FIG. 2A is a schematic cross-sectional view of the related art in-plane switching mode liquid crystal display device in an ON state.
Figure 2B:
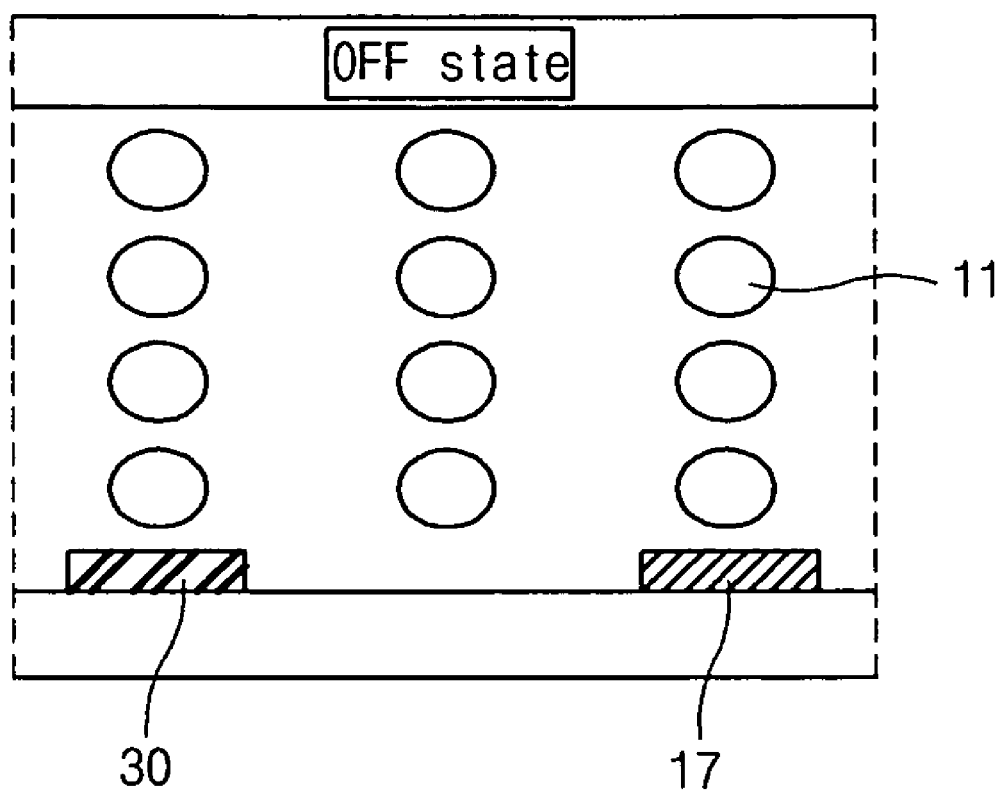
FIG. 2B is a schematic cross-sectional view of the related art in-plane switching mode liquid crystal display device in an OFF state.
Figure 3:
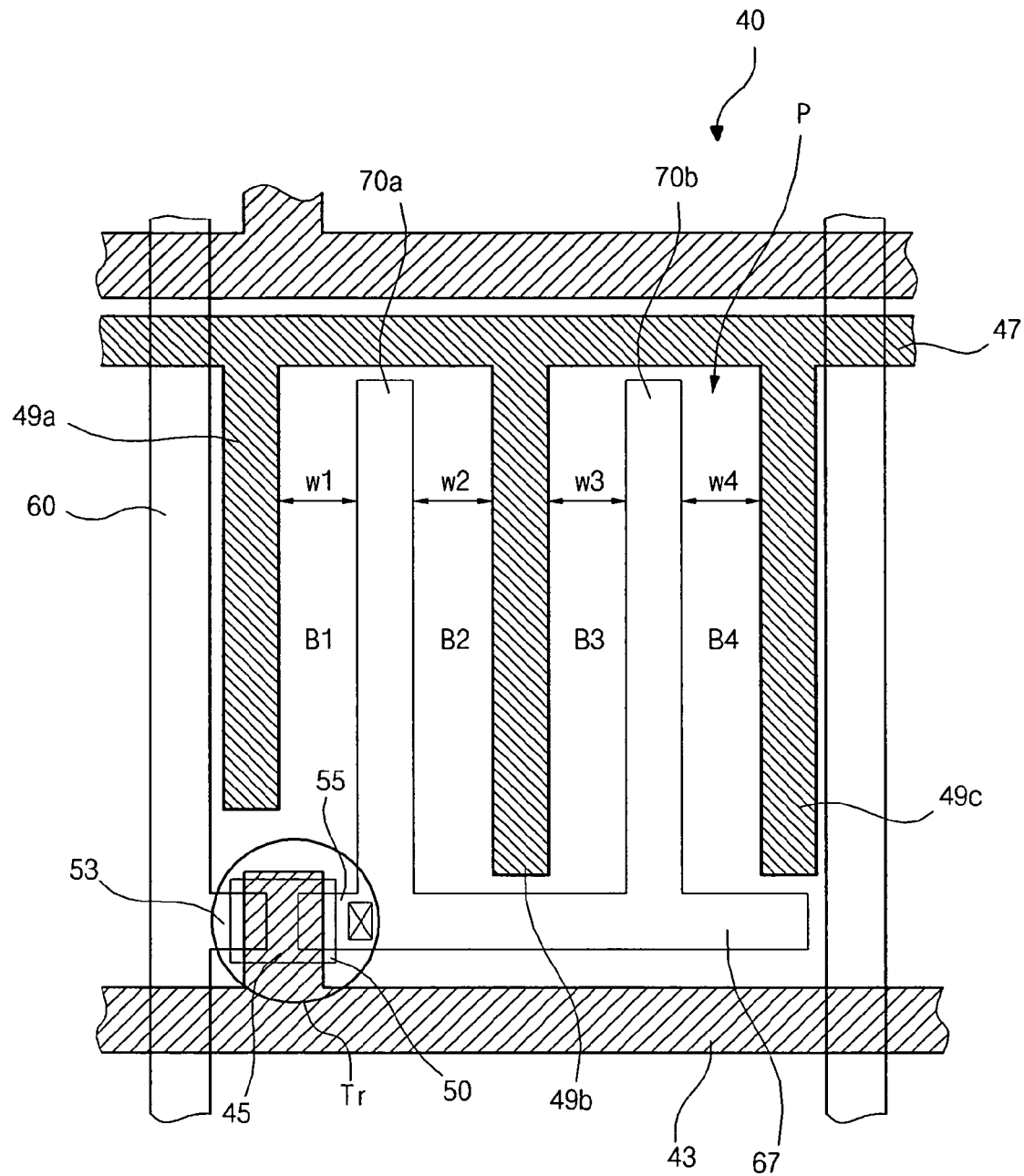
FIG. 3 is a schematic plane view showing an array substrate for the related art in-plane switching mode liquid crystal display device.
Figure 4:
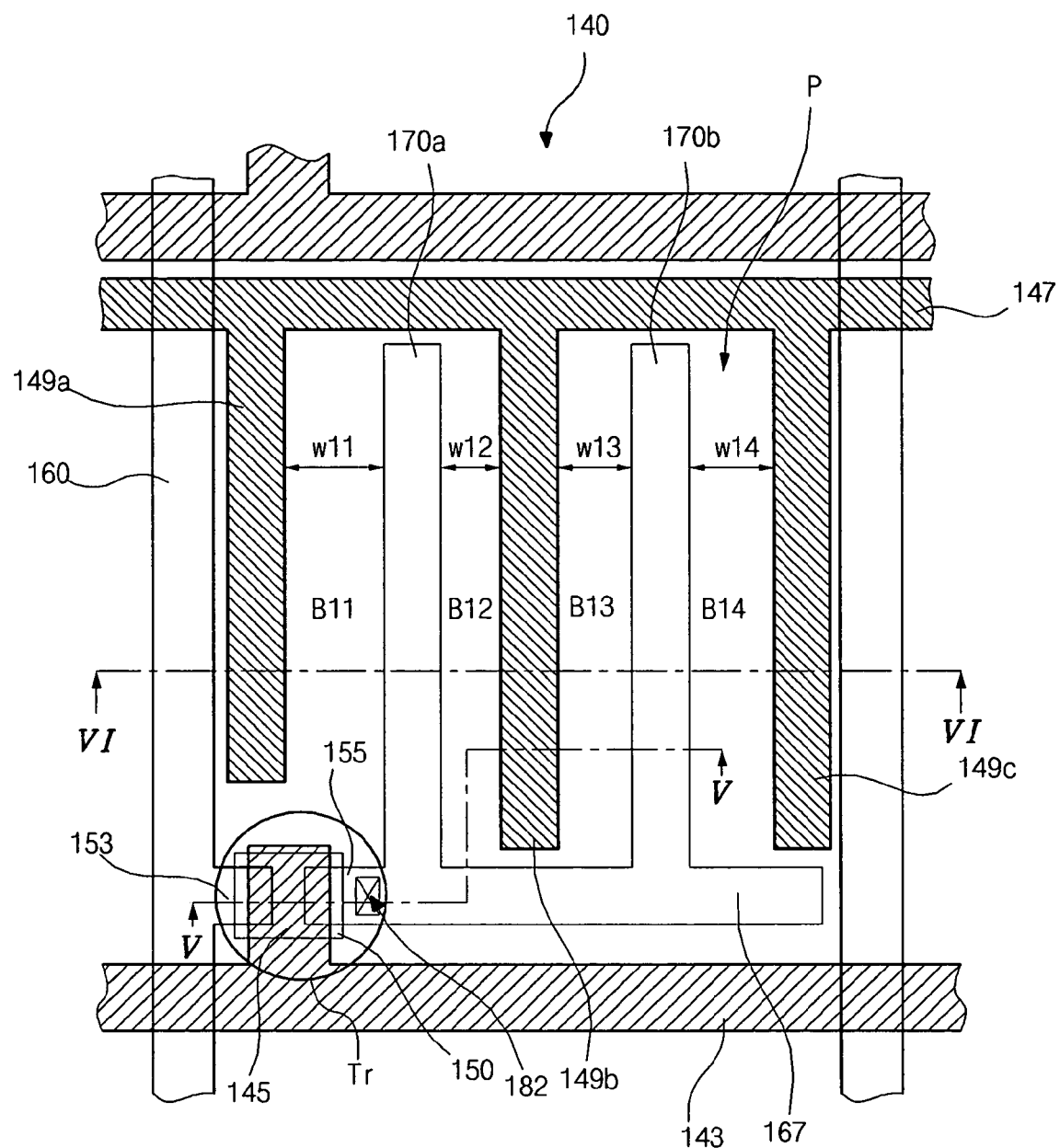
FIG. 4 is a schematic plane view showing an array substrate for an in-plane switching mode liquid crystal display device according to an embodiment of the present invention.

FIG. 4 is a schematic plane view showing an array substrate for an in-plane switching mode liquid crystal display device according to an embodiment of the present invention.

In FIG. 4, a gate line 143, a common line 147, and a data line 160 are formed on a substrate 140. The common line 147 parallel to the gate line 143 is disposed adjacent to the gate line 143, and the data line 160 crosses the gate line 143 to define a pixel region "P." A thin film transistor (TFT) "Tr" is connected to the gate line 143 and the data line 160. The TFT "Tr" includes a gate electrode 145, a semiconductor layer 150, a source electrode 153 and a drain electrode 155. The gate electrode 145 extends from the gate line 143. Even though not shown in FIG. 4, a gate insulating layer is formed on the gate electrode 145 and the semiconductor layer 150 on the gate insulating layer includes an active layer and an ohmic contact layer. The source electrode 153 extends from the data line 160. The source and drain electrodes 153 and 155 contact the semiconductor layer 150.

In addition, a plurality of common electrodes and a plurality of pixel electrodes are formed in the pixel region "P." The plurality of common electrodes extend from the common line 147 and are substantially parallel to the data line 160. For example, the plurality of common electrodes includes first, second and third common electrodes 149a, 149b and 149c. Even though the first and third common electrodes 149a and 149c are spaced apart from the data line 160, at least one of the first and the third common electrodes may overlap the data line 160 in another embodiment. Moreover, a pixel line 167 is connected to the drain electrode 155. The plurality of pixel electrodes extend from the pixel line 167 and are parallel to the data line 160. For example, the plurality of pixel electrodes includes first and second pixel electrodes 170a and 170b. The first, second and third common lines 149a, 149b and 149c alternate with the first and second pixel electrodes 170a and 170b. Accordingly, the first common electrode 149a and the first pixel electrode 170a define a first block "B11" having a first width "w11." Similarly, the first pixel electrode 170a and the second common electrode 149b define a second block "B12" having a second width "w12," and the second common electrode 149b and the second pixel electrode 170b define a third block "B13" having a third width "w13." Finally, the second pixel electrode 170b and the third common electrode 149c define a fourth block "B14" having a fourth width "w14." The first to fourth widths "w11" to "w14" are gap distances between the adjacent common and pixel electrodes, respectively.

Figure 5:
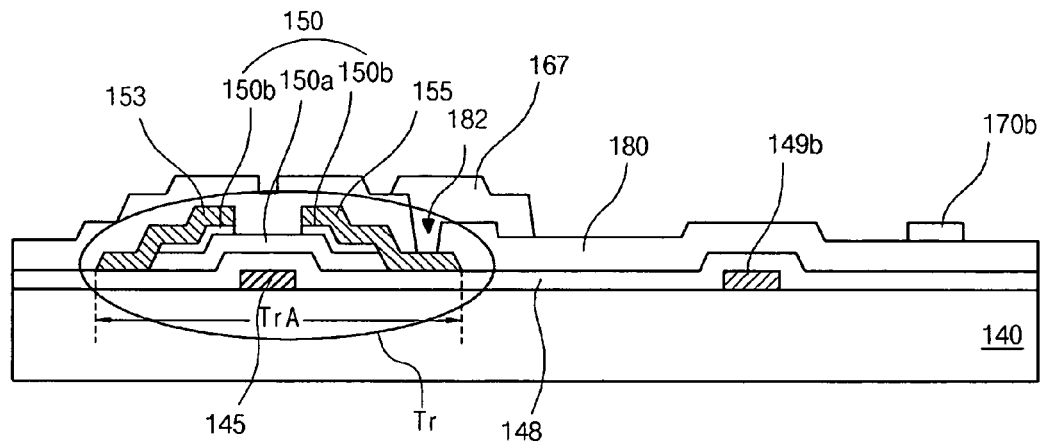
FIG. 5 is a schematic cross-sectional view taken along a line "V-V" of FIG. 4.
Figure 6:
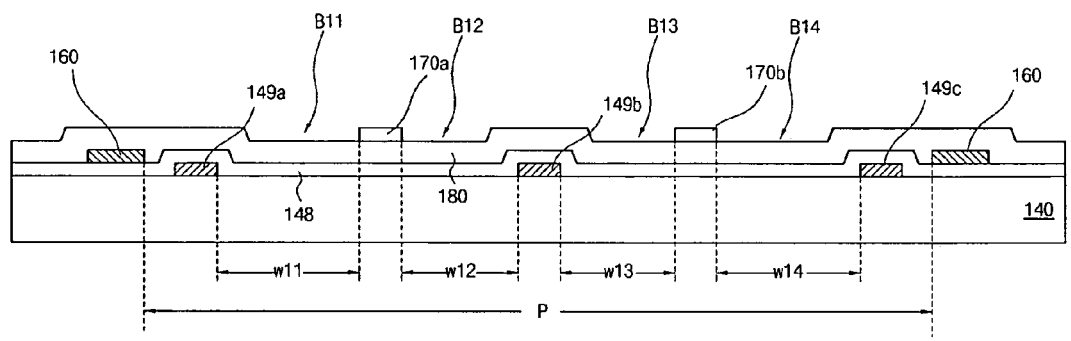
FIG. 6 is a schematic cross-sectional view taken along a line "VI-VI" of FIG. 4.

FIG. 5 is a schematic cross-sectional view taken along a line "V-V" of FIG. 4, and FIG. 6 is a schematic cross-sectional view taken along a line "VI-VI" of FIG. 4.

In FIGS. 5 and 6, the gate line 143 (of FIG. 4), the gate electrode 145, the common line 147 (of FIG. 4), and the first, second and third common electrodes 149a, 149b and 149c are formed on the substrate 140. The gate insulating layer 148 is formed on the gate line 143 (of FIG. 4), the gate electrode 145, the common line 147 (of FIG. 4), and the first, second and third common electrodes 149a, 149b and 149c. The semiconductor layer 150 including the active layer 150a and the ohmic contact layer 150b are formed on the gate insulating layer 148 over the gate electrode 145 in a transistor area "TrA." The data line 160 crossing the gate line 143 (of FIG. 4) and the common line 147 (of FIG. 4) is formed on the gate insulating layer 148. The source and drain electrodes 153 and 155 are formed on the semiconductor layer 150. The source electrode 153 extends from the data line 160 and the drain electrode 155 is spaced apart from the source electrode 153. The gate electrode 145, the semiconductor layer 150, the source electrode 153 and the drain electrode 155 constitute the thin film transistor (TFT) "Tr."

In addition, a passivation layer 180 is formed on the source and drain electrodes 153 and 155. The passivation layer 180 includes a contact hole 182 exposing the drain electrode 155. The pixel line 167, the first pixel electrode 170a and the second pixel electrode 170b are formed on the passivation layer 180. The pixel line 167 is connected to the drain electrode 155 through the contact hole 182, and the first and second pixel electrodes 170a and 170b extend from the pixel line 167. Moreover, the first and second pixel electrodes 170a and 170b are alternately disposed with the first, second and third common electrodes 149a, 149b and 149c. Although the first and second pixel electrodes 170a and 170b are formed on the passivation layer 180, the first and second pixel electrodes 170a and 170b may be formed on the gate insulating layer 148 in another embodiment.

In an alternate disposition of the common electrodes and the pixel electrodes, the first common electrode 149a and the first pixel electrode 170a define a first block "B11" having a first width "w11." Similarly, the first pixel electrode 170a and the second common electrode 149b define a second block "B12" having a second width "w12," and the second common electrode 149b and the second pixel electrode 170b define a third block "B13" having a third width "w13." Finally, the second pixel electrode 170b and the third common electrode 149c define a fourth block "B14" having a fourth width "w14." The first to fourth widths "w11" to "w14" are gap distances between the adjacent common and pixel electrodes, respectively.

In this embodiment, at least one of the first to fourth widths "w11" to "w14" is different from the others. As a gap distance between adjacent common and pixel electrodes decreases, a driving voltage applied to the pixel electrode is reduced. Accordingly, a voltage for a white image and a power consumption are reduced. In addition, a response time is also reduced and a stability of an IPS mode LCD device is improved. On the other hand, as a gap distance between the adjacent common and pixel electrodes increases, aperture ratio increases and brightness is improved. As a result, when gap distances between the adjacent common and pixel electrodes are different from each other, a driving voltage is reduced and aperture ratio is improved. Furthermore, when a single data signal is applied to the pixel electrodes, electric fields of the blocks are different from each other due to different widths. Accordingly, the blocks form distinct domains, thereby obtaining a multi domain.

For example, the widths of the blocks may gradually increase such that the first width is smallest and the fourth width "w14" is greatest (w11<w12<w13<w14). The second width "w12" and the third width "w13" greater than the second width "w12" are between the first and fourth widths "w11" and "w14."

In addition, the widths of the blocks may gradually decrease such that the first width is greatest and the fourth width "w14" is smallest (w11>w12>w13>w14). The second width "w12" and the third width "w13" smaller than the second width "w12" are between the first and fourth widths "w11" and "w14."

Further, the widths of the central blocks may be equal and the width of the boundary blocks may be equal such that the width of the two block groups are different from each other (w11=w14≠w12=w13).

Similarly, the widths of the right blocks may be equal and the width of the left blocks may be equal such that the width of the two block groups are different from each other (w11=w12≠w13=w14).

Finally, the widths of the three blocks may be equal and the width of the other block may be different form the widths of the three blocks (w11=w12=w13≠w14 or w11≠w12=w13=w14). The various different relations of the widths different from each other may be obtained in another embodiment.

The different widths can be obtained by adjusting widths of the common electrode and/or the pixel electrode. For example, the differences of the first to fourth widths "w11" to "w14" may be obtained from differences in a width of the first to third common electrodes 149a to 149c and the first and second pixel electrodes 170a and 170b. In addition, the different widths can be obtained by adjusting gap distances between the adjacent common and pixel electrodes when the common electrodes and the pixel electrodes have an equal width.

Even though four blocks "B11," "B12," "B13" and "B14" are defined in a pixel region in FIGS. 4 to 6, the present invention may be applied to an IPS mode LCD device having more than six blocks in another embodiment by increasing the number of common and pixel electrodes in a pixel region. Moreover, although the pixel electrode is formed on the passivation layer in FIGS. 4 to 6, the present invention may be applied to an IPS mode LCD device having a common electrode under a gate insulating layer and a pixel electrode on the gate insulating layer, or other IPS mode configurations.

In this embodiment, at least one of the widths of the blocks is different from the others. Accordingly, the widths of the blocks are irregularly formed in a pixel region. As the width decreases, a driving voltage applied to the pixel electrode, a voltage for a white image and a power consumption are reduced. Accordingly, a response time is also reduced and a stability of an IPS mode LCD device is improved. On the other hand, as the width increases, aperture ratio and brightness increases. Therefore, when the widths are irregularly formed, a driving voltage is reduced and aperture ratio is improved. Moreover, multi domain is obtained and a viewing angle is improved.

Figure 7:
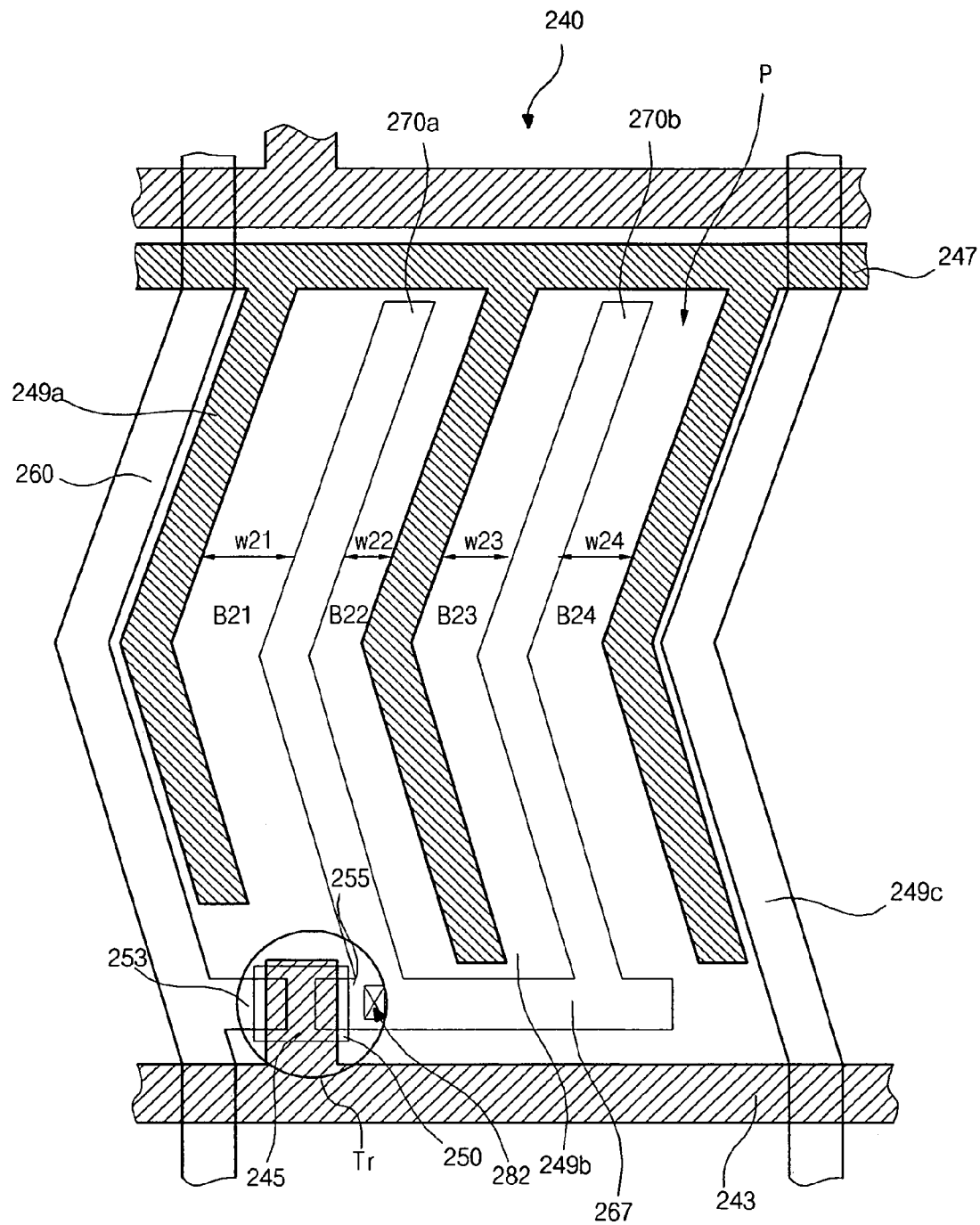
FIG. 7 is a schematic plane view showing an array substrate for an in-plane switching mode liquid crystal display device according to another embodiment of the present invention.

FIG. 7 is a schematic plane view showing an array substrate for an in-plane switching mode liquid crystal display device according to another embodiment of the present invention.

In FIG. 7, a gate line 243, a common line 247, and a data line 260 are formed on a substrate 240. The common line 247 parallel to the gate line 243 is disposed adjacent to the gate line 243, and the data line 260 crosses the gate line 243 to define a pixel region "P." The data line 260 has a bent shape in the pixel region "P" to form distinct domains. A thin film transistor (TFT) "Tr" is connected to the gate line 243 and the data line 260. The TFT "Tr" includes a gate electrode 245, a semiconductor layer 250, a source electrode 253 and a drain electrode 255. The gate electrode 245 extends from the gate line 243. Even though not shown in FIG. 5, a gate insulating layer is formed on the gate electrode 245 and the semiconductor layer 250 on the gate insulating layer includes an active layer and an ohmic contact layer. The source electrode 253 extends from the data line 260. The source and drain electrodes 253 and 255 contact the semiconductor layer 250.

In addition, a plurality of common electrodes and a plurality of pixel electrodes are formed in the pixel region "P." The plurality of common electrodes extend from the common line 247 and are parallel to the data line 260. Accordingly, the plurality of common electrodes have a bent shape in the pixel region "P." For example, the plurality of common electrodes includes first, second and third common electrodes 249a, 249b and 249c each having a bent shape. Moreover, a pixel line 267 is connected to the drain electrode 255. The plurality of pixel electrodes extend from the pixel line 267 and are parallel to the data line 260. Accordingly, the plurality of pixel electrodes have a bent shape in the pixel region "P." For example, the plurality of pixel electrodes includes first and second pixel electrodes 270a and 270b each having a bent shape. The first, second and third common lines 249a, 249b and 249c alternate with the first and second pixel electrodes 270a and 270b. Accordingly, the first common electrode 249a and the first pixel electrode 270a define a first block "B21" having a first width "w21." Similarly, the first pixel electrode 270a and the second common electrode 249b define a second block "B22" having a second width "w12," and the second common electrode 249b and the second pixel electrode 270b define a third block "B23" having a third width "w23." Finally, the second pixel electrode 270b and the third common electrode 249c define a fourth block "B24" having a fourth width "w24." The first to fourth widths "w21" to "w24" are gap distances between the adjacent common and pixel electrodes, respectively.

The first to fourth widths "w21" to "w24" are formed such that at least one width is different from the other three widths. Accordingly, when a single data signal is applied to the pixel electrodes, electric fields generated in the blocks may be different from each other due to the different widths. As a result, distinct domains are formed in the blocks, thereby automatically obtaining a multi domain. In this embodiment, the data line 260, the common electrodes 249a, 249b and 249c, and the pixel electrodes 270a and 270b have a bent shape in the pixel region "P," and the bent shape forms distinct two domains. Consequently, eight distinct domains are formed in the pixel region "P" due to the different gap distances and the bent shape.

In an IPS mode LCD device according to the present invention, gap distances between the adjacent common and pixel electrodes are irregularly formed such that at least one gap distance is different from the other gap distances. Accordingly, a driving voltage and a power consumption are reduced due to a smaller gap distance. In addition, aperture ratio and brightness are improved due to a greater gap distance. Further, since electric fields between the adjacent common and pixel electrodes are different from each other, distinct domains are formed in a pixel region and a multi domain is obtained to improve a viewing angle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a substrate;
a gate line and a data line on the substrate, the gate line crossing the data line to define a pixel region;
a common line parallel to the gate line;
a thin film transistor connected to the gate line and the data line;
a plurality of common electrodes extending from the common line; and
a plurality of pixel electrodes alternating with the plurality of common electrodes,
wherein a gap distance is defined as a width of a block by the adjacent common and pixel electrode in the pixel region, and at least one gap distance is different from the other gap distances,
wherein the plurality of common electrodes include first, second and third common electrodes, and the plurality of pixel electrodes include first and second pixel electrodes to form a first gap distance (w1) between the first common electrode and the first pixel electrode, a second gap distance (w2) between the first pixel electrode and the second common electrode, a third gap distance (w3) between the second common electrode and the second pixel electrode, and a fourth gap distance (w4) between the second pixel electrode and the third common electrode, and wherein the first to fourth gap distances gradually increase (w1<w2<w3<w4) or gradually decrease (w1>w2>w3>w4).

2. The liquid crystal display device according to claim 1, wherein the plurality of common electrodes and the plurality of pixel electrodes have an equal width.

3. The liquid crystal display device according to claim 1, wherein a width of at least one of the plurality of common electrodes and the plurality of pixel electrodes are different from widths of the others of the plurality of common electrodes and the plurality of pixel electrodes.

4. The liquid crystal display device according to claim 1, wherein the plurality of common electrodes and the plurality of pixel electrodes have a bent shape.

5. The liquid crystal display device according to claim 1, wherein the plurality of common electrodes and the plurality of pixel electrodes are parallel to the data line.

6. The liquid crystal display device according to claim 1, wherein the thin film transistor includes a gate electrode connected to the gate line, a source electrode connected to the data line and a drain electrode spaced apart from the source electrode.

7. The liquid crystal display device according to claim 6, further comprising a pixel line connected to the drain electrode.

8. The liquid crystal display device according to claim 7, wherein the plurality of pixel electrodes extend from the pixel line.

9. The liquid crystal display device according to claim 6, further comprising a gate insulating layer on the gate electrode and a passivation layer on the source and drain electrodes.

10. The liquid crystal display device according to claim 9, wherein the plurality of common electrodes are formed under the gate insulating layer and the plurality of pixel electrodes are formed on the gate insulating layer.

11. The liquid crystal display device according to claim 9, wherein the plurality of common electrodes are formed under the gate insulating layer and the plurality of pixel electrodes are formed on the passivation layer.

12. The liquid crystal display device according to claim 1, wherein the liquid crystal display device is an in-plane switching mode.

13. A method of forming a liquid crystal display device, comprising:
    forming a gate line, a common line parallel to the gate line, a plurality of common electrodes extending from the common line and a data line on a substrate, the gate line crossing the data line to define a pixel region;
    forming a thin film transistor connected to the gate line and the data line; and
    forming a plurality of pixel electrodes alternating with the plurality of common electrodes,
    wherein a gap distance is defined as a width of a block by the adjacent common and pixel electrode in the pixel region, and at least one gap distance is different from the other gap distances,
    wherein the plurality of common electrodes include first, second and third common electrodes, and the plurality of pixel electrodes include first and second pixel electrodes to form a first gap distance (w1) between the first common electrode and the first pixel electrode, a second gap distance (w2) between the first pixel electrode and the second common electrode, a third gap distance (w3) between the second common electrode and the second pixel electrode, and a fourth gap distance (w4) between the second pixel electrode and the third common electrode, and
    wherein the first to fourth gap distances gradually increase (w1<w2<w3<w4) or gradually decrease (w1>w2>w3>w4).

14. The method according to claim 13, wherein the plurality of common electrodes and the plurality of pixel electrodes have an equal width.

15. The method according to claim 13, wherein a width of at least one of the plurality of common electrodes and the plurality of pixel electrodes are different from widths of the others of the plurality of common electrodes and the plurality of pixel electrodes.

16. The method according to claim 13, wherein the plurality of common electrodes and the plurality of pixel electrodes have a bent shape.

17. The method according to claim 13, wherein the plurality of common electrodes and the plurality of pixel electrodes are parallel to the data line.

18. The method according to claim 13, wherein the thin film transistor includes a gate electrode connected to the gate line, a source electrode connected to the data line and a drain electrode spaced apart from the source electrode.

19. The method according to claim 18, further comprising a pixel line connected to the drain electrode.

20. The method according to claim 19, wherein the plurality of pixel electrodes extend from the pixel line.

21. The method according to claim 18, further comprising a gate insulating layer on the gate electrode and a passivation layer on the source and drain electrodes.

22. The method according to claim 21, wherein the plurality of common electrodes are formed under the gate insulating layer and the plurality of pixel electrodes are formed on the gate insulating layer.

23. The method according to claim 21, wherein the plurality of common electrodes are formed under the gate insulating layer and the plurality of pixel electrodes are formed on the passivation layer.

24. The method according to claim 13, wherein the liquid crystal display device is an in-plane switching mode.

25. An in-plane switching mode liquid crystal display device, comprising:
    a substrate;
    a gate line and a data line on the substrate, the gate line crossing the data line to define a pixel region;
    a common line parallel to the gate line;
    a thin film transistor connected to the gate line and the data line;
    a plurality of common electrodes extending from the common line; and
    a plurality of pixel electrodes alternating with the plurality of common electrodes,
    wherein a gap distance is defined as a width of a block by the adjacent common and pixel electrode in the pixel region, and at least one gap distance is different from the other gap distances, wherein the at least one gap distance different from the other gap distances provides a multi-domain structure to improve the viewing angle, wherein the plurality of common electrodes include first, second and third common electrodes, and the plurality of pixel electrodes include first and second pixel electrodes to form a first gap distance (w1) between the first common electrode and the first pixel electrode, a second gap distance (w2) between the first pixel electrode and the second common electrode, a third gap distance (w3) between the second common electrode and the second pixel electrode, and a fourth gap distance (w4) between the second pixel electrode and the third common electrode, and wherein the first to fourth gap distances gradually increase (w1<w2<w3<w4) or gradually decrease (w1>w2>w3>w4).

26. The in-plane switching mode liquid crystal display device according to claim 25, wherein the at least one gap distance different from the other gap distance provides a higher aperture ratio as compared to gap distances that are all the same.

* * * * *